United States Patent
Gokita (10) Patent No.: US 7,492,541 B2
(45) Date of Patent: Feb. 17, 2009

(54) APPARATUS AND METHOD OF MONITORING HARD DISK DRIVE

(75) Inventor: Junko Gokita, Osaka (JP)

(73) Assignee: Panasonic Corporation, Osaka (JP)

( * ) Notice: Subject to any disclaimer, the term of this patent is extended or adjusted under 35 U.S.C. 154(b) by 111 days.

(21) Appl. No.: 11/690,325

(22) Filed: Mar. 23, 2007

(65) Prior Publication Data

US 2007/0230011 A1    Oct. 4, 2007

(30) Foreign Application Priority Data

Mar. 31, 2006  (JP) .............................. 2006-098822
Jan. 15, 2007  (JP) .............................. 2007-005616

(51) Int. Cl.
*G11B 19/02*   (2006.01)

(52) U.S. Cl. ............................................... 360/69

(58) Field of Classification Search ............... 360/69, 360/75, 71, 73.03; 369/47.38, 30.03, 47.44; 713/300, 321, 324, 323; 386/125; 318/400.3, 318/560; 714/47

See application file for complete search history.

(56) References Cited

U.S. PATENT DOCUMENTS

| | | | | |
|---|---|---|---|---|
| 5,204,593 A | * | 4/1993 | Ueki | 318/400.3 |
| 5,638,307 A | * | 6/1997 | Kamimura et al. | 713/321 |
| 5,652,891 A | * | 7/1997 | Kitamura et al. | 713/324 |
| 5,809,316 A | * | 9/1998 | Gouzu | 713/323 |
| 5,889,939 A | * | 3/1999 | Iida | 714/47 |
| 6,072,652 A | * | 6/2000 | Lee | 360/71 |
| 6,118,743 A | * | 9/2000 | Kumita | 369/47.44 |
| 6,301,070 B1 | * | 10/2001 | Sakaguchi | 360/73.03 |
| 6,566,832 B2 | * | 5/2003 | Ataee | 318/560 |
| 6,595,487 B2 | * | 7/2003 | Johansen et al. | 251/129.04 |
| 7,072,135 B2 | * | 7/2006 | Suzuki | 360/75 |
| 7,072,576 B2 | * | 7/2006 | Tanaka | 386/125 |
| 7,369,346 B2 | * | 5/2008 | Yamamoto | 360/75 |
| 2007/0183282 A1 | * | 8/2007 | Oyabu | 369/47.38 |
| 2007/0208957 A1 | * | 9/2007 | Leis | 713/300 |
| 2008/0019224 A1 | * | 1/2008 | Ishibashi | 369/30.03 |

FOREIGN PATENT DOCUMENTS

JP        09-259014        3/1997

\* cited by examiner

*Primary Examiner*—Fred Tzeng
(74) *Attorney, Agent, or Firm*—RatnerPrestia (57) ABSTRACT

An apparatus and method of monitoring a hard disk drive (HDD) include a HDD motor state detector for detecting the state of the motor of the HDD. Because the control information on the HDD is not acquired while the motor of the HDD is stopped, the HDD is not accessed and the motor is not operated. This structure can provide a HDD monitoring apparatus that prevents troubles induced during the motor is running.

18 Claims, 6 Drawing Sheets

APPARATUS AND METHOD OF MONITORING HARD DISK DRIVE

FIELD OF THE INVENTION

The present invention relates to an apparatus and method of monitoring a hard disk drive.

BACKGROUND OF THE INVENTION

In recent years, hard disk drives (hereinafter referred to as HDDs) have been used in various kinds of fields, such as personal computers (PCs) and television (TV) receivers, as the HDDs are downsized and the capacity thereof is increased. On the other hand, HDDs are less resistant to vibration and heat, and failures in the HDDs frequently cause troubles. To address this problem, a HDD is monitored and a warning is given to the user when the state thereof deteriorates.

A conventional HDD monitoring apparatus is described hereinafter.

Conventionally, a common way of monitoring a HDD is to acquire information on control of the HDD obtained by a SMART function, which will be detailed later, at a predetermined time interval, and to give a warning to the user when data to be the factors responsible for failures is detected. The control information on the HDD includes the time and frequency of energization of the HDD, information on the temperature rise of the HDD, and information on the number of defective sectors. Because such control information is related to the factors of failures in the HDD, acquiring and analyzing such control information allows the failures in the HDD to be foreseen.

Figure 8:
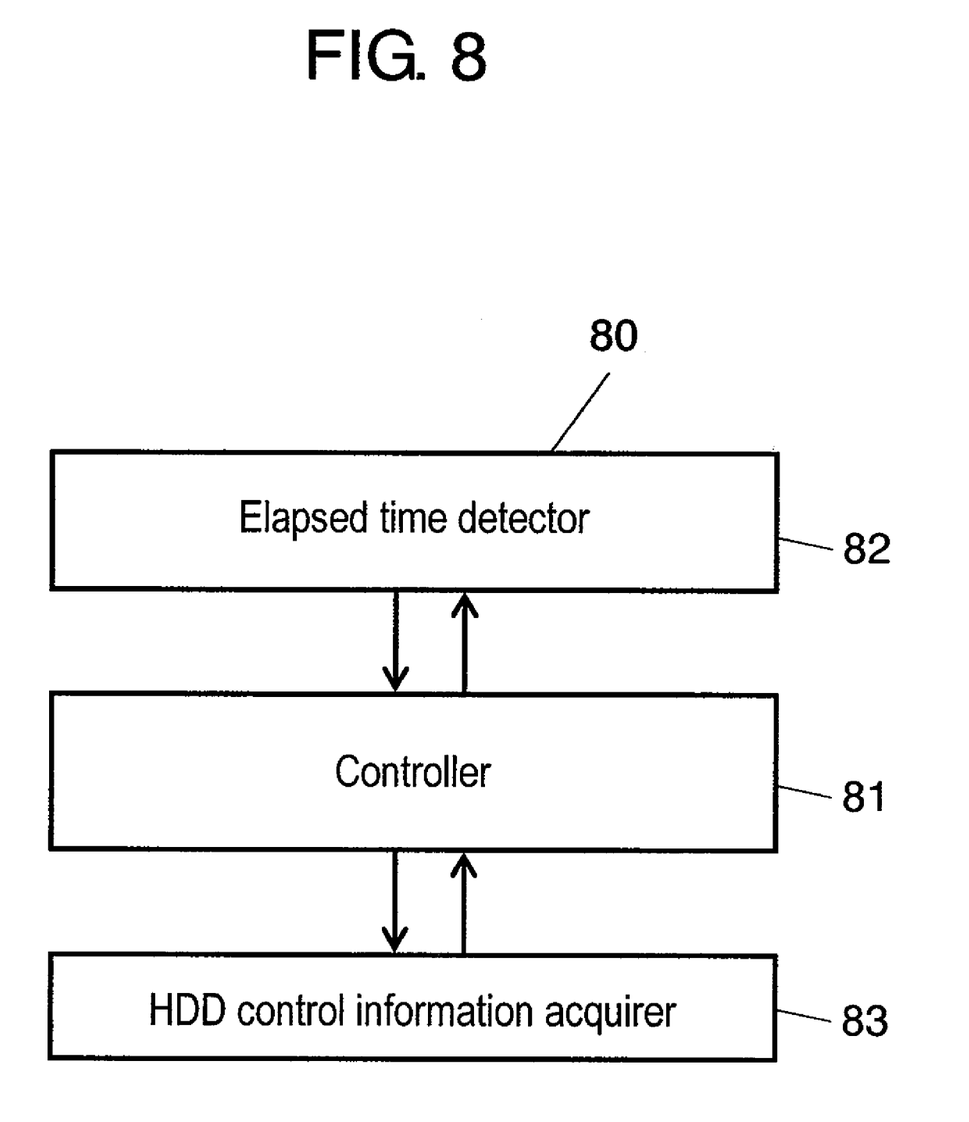
FIG. 8 is a block diagram of a conventional HDD monitoring apparatus.

FIG. 8 is a block diagram of a conventional HDD monitoring apparatus. A description is provided of the conventional HDD monitoring apparatus, with reference to FIG. 6.

In FIG. 8, HDD monitor 80 is made of controller 81, elapsed time detector 82, and HDD control information acquirer 83.

Controller 81 detects information from elapsed time detector 82. When a predetermined time period has elapsed, HDD control information acquirer 83 acquires information on control of a HDD (not shown), and controller 81 determines the acquired value. When the state of the HDD has deteriorated, controller 81 gives a warning to the user.

Such a conventional HDD monitoring apparatus is disclosed in Japanese Patent Unexamined Publication No. H09-259014, for example.

When a personal computer (PC) is shocked by falling while the HDD thereof is in operation, the data recording/reproducing head hits and damages the surface of the disk. Thus, the data cannot be reproduced. In the worst case, the entire recording surface of the disk cannot be used, in other words, the HDD is destroyed.

A recent small HDD incorporated in a notebook PC has a head retracting mechanism to increase shock resistance thereof during operation. In a HDD, for example, the recording/reproducing head is retracted in a position at a distance from the disk surface and locked in the position by a head locking mechanism in an idling state thereof (when the motor of the HDD, which will be described later, is stopped) in which access is not requested for a predetermined time period, even with the HDD not in operation (when the PC is in a power-off, shut down, or stand-by state described later) and in operation. This structure can avoid occurrence of the HDD troubles, such as physical damages to the surface of the disk caused by the shock of the head to the surface of the disk, in the idling state while the HDD is not in operation.

On the other hand, while the HDD is in operation and not in the idling state, i.e. while the motor of the HDD is started and rotated so that the data is accessible by the head, there is still a high possibility of occurrence of the troubles. However, the motor is started even when the HDD is stopped so that the data is accessible and the control information can be acquired at a predetermined time interval. Thus, contrary to the expectations, this structure poses a problem of inducing troubles while the motor of the HDD is running.

SUMMARY OF THE INVENTION

A hard disk drive (HDD) monitoring apparatus including:
- an elapsed time detector for detecting a predetermined time period has elapsed while a system including a HDD is in operation;
- a HDD motor state detector for detecting the state of the motor of the HDD;
- a HDD control information acquirer for acquiring control information on the HDD;
- an information storage for storing the control information; and
- a controller for taking control so that the HDD control information acquirer acquires the control information, and the information storage stores the control information, when the elapsed time detector detects the predetermined time period has elapsed and the HDD motor state detector detects the motor of the HDD is not stopped.

A hard disk drive monitoring apparatus including:
- a power supply state change detector for detecting a change in the state of the power supply of a system including a HDD;
- a HDD motor state detector for detecting the state of the motor of the HDD;
- a HDD control information acquirer for acquiring control information on the HDD;
- an information storage for storing the control information; and
- a controller for taking control so that the HDD control information acquirer acquires the control information and the information storage stores the control information, when the power supply state detector detects a change in the state of the power supply of the system and the HDD motor state detector detects that the motor of the HDD is not stopped.

A hard disk drive monitoring method including:
- detecting a predetermined time period has elapsed while a system including a HDD is in operation;
- detecting the state of the motor of the HDD;
- acquiring control information on the HDD, when detecting the predetermined time period has elapsed and the motor of the HDD is not stopped; and
- recording the control information.

A hard disk drive monitoring method including:
- detecting a change in the state of the power supply of a system including a HDD;
- detecting the state of the motor of the HDD;

acquiring control information on the HDD, when detecting the state of the power supply of the system has changed and the motor of the HDD is not stopped; and recording the control information.

DETAILED DESCRIPTION OF THE EXEMPLARY EMBODIMENTS

The present invention addresses the above conventional problem, and provides an apparatus and method of monitoring a hard disk drive (hereinafter referred to as a HDD) without inducing troubles in the HDD.

A description is provided of an exemplary embodiment of the present invention, with reference to FIGS. 1 through 7.

Figure 1:
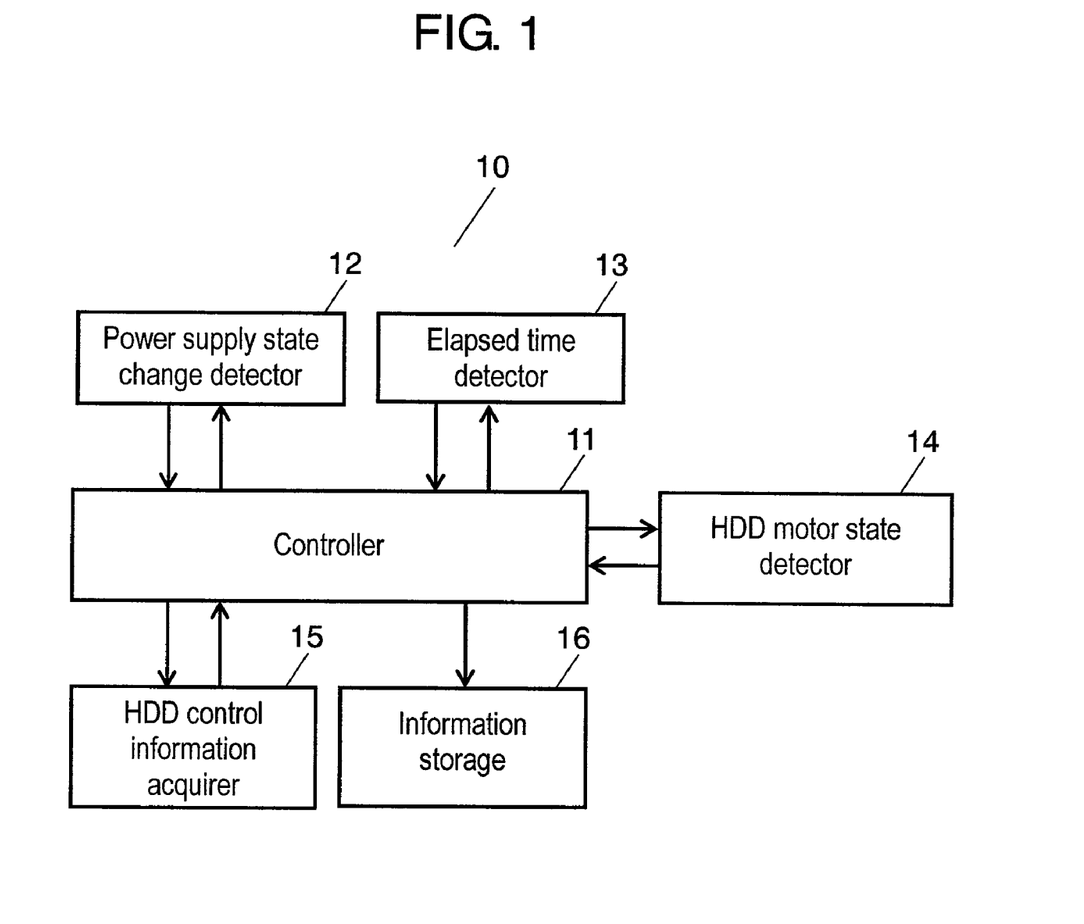
FIG. 1 is a block diagram of a hard disk drive (HDD) monitoring apparatus in accordance with an exemplary embodiment of the present invention.

FIG. 1 is a block diagram of a HDD monitoring apparatus in accordance with an exemplary embodiment of the present invention. First, a description is provided of a structure of hard disk drive monitoring apparatus 10 (hereinafter referred to as HDD monitoring apparatus 10). With reference to FIG. 1, HDD monitoring apparatus 10 includes the following components: controller 11; power supply state change detector 12 for detecting changes in the state of the power supply of a system, such as a personal computer (hereinafter referred to as PC), including a HDD; elapsed time detector 13 for detecting a predetermined time period has elapsed while the system including the HDD is in operation; HDD motor state detector 14 for detecting the operating state of the motor of the HDD if the motor is rotated or stopped; and HDD control information acquirer 16; and information storage 16. HDD control information acquirer 15 is a means of acquiring SMART (Self-Monitoring, Analysis, And Reporting Technology) information, including the time and frequency of energization of the HDD, the history of internal temperature rises, and the number of defective sectors. Information storage 16 stores the control information acquired by HDD control information acquirer 15. The states of the power supply include a power-on state, power-off state, hibernation state, and stand-by state of a PC. Power supply state change detector 12 detects changes between these states.

Next, a description is provided of the operation of HDD monitoring apparatus 10 structured as above.

First, controller 11 constantly detects information from power supply state change detector 12 and elapsed time detector 13. When the state of the power supply has changed, or a predetermined time period has elapsed, controller 11 asks HDD motor state detector 14 whether or not the motor of the HDD is stopped. When the motor of the HDD is not stopped, HDD control information acquirer 15 acquires control information on the HDD. Controller 11 stores the information acquired by HDD control information acquirer 15 into information storage 16, i.e. the HDD.

Incidentally, the stop state of the HDD motor shows a state in which the HDD itself is energized with the motor thereof stopped for power saving, and stands ready for data access when the operator continuously stops the operation of the keyboard or mouse for a period and thus no data is recorded into or reproduced from the HDD, for example.

Figure 2:
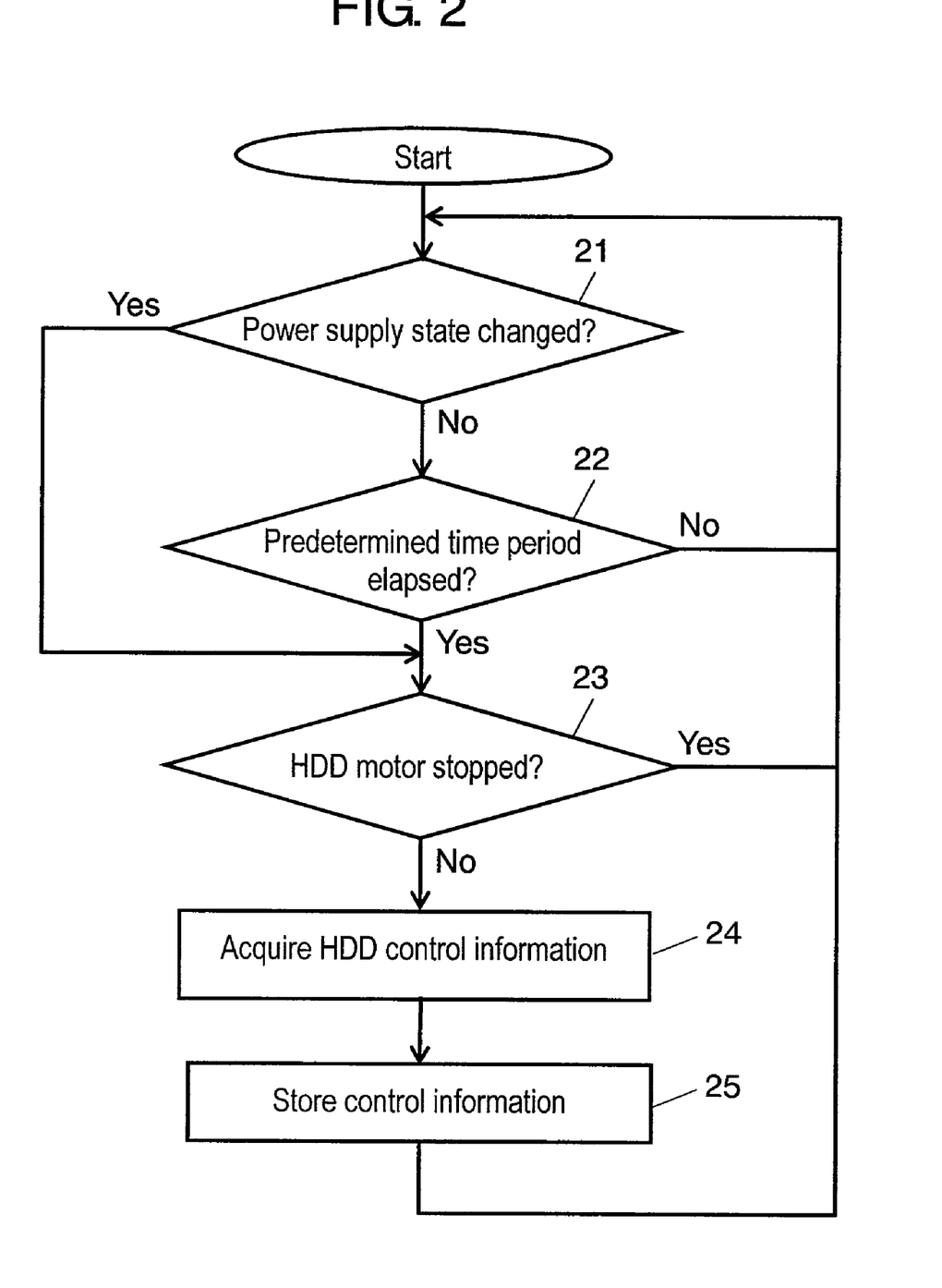
FIG. 2 is a flowchart of a HDD monitoring method in accordance with the exemplary embodiment of the present invention.

FIG. 2 is a flowchart of a HDD monitoring method in accordance with this exemplary embodiment.

With reference to FIG. 2, after the system starts, it is determined in Step 21 if the power supply state has changed or not. When no change has been determined, it is determined in Step 22 if a predetermined time period has elapsed. Then, when it is determined that the predetermined time period has not elapsed, control returns to Step 21. The system is a PC, for example.

When it is determined in Step 21 that the power supply state has changed, or when it is determined in Step 22 that the predetermined time period has elapsed, control goes to Step 23.

In Step 23, it is determined if the motor of the HDD is stopped or not. When it is stopped, control returns to Step 21. When it is not stopped, control information on the HDD is acquired in Step 24. Then, in Step 25, information acquired in Step 24 is stored in an arbitrary storage area in the HDD.

As described above, this exemplary embodiment monitors the HDD by acquiring control information thereof, and does not acquire the HDD control information while the motor of the HDD is stopped. This structure allows the system to avoid the operation of the motor of the HDD to acquire the HDD control information while the motor of the HDD is stopped. No access to the HDD while the motor of the HDD is stopped can continue the stop state of the motor of the HDD and decrease the troubles induced in the HDD.

Figure 3:
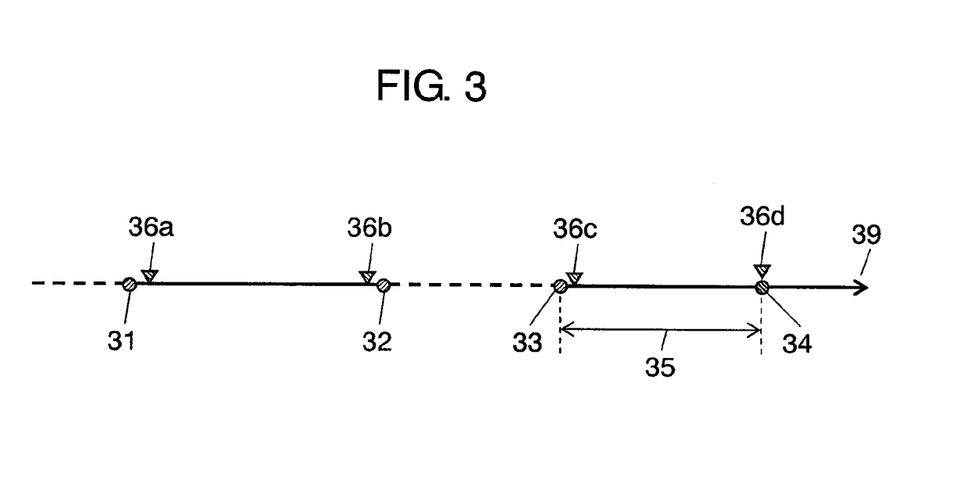
FIG. 3 is a timing chart illustrating operation of the HDD monitoring apparatus in accordance with the exemplary embodiment of the present invention.
Figure 4:
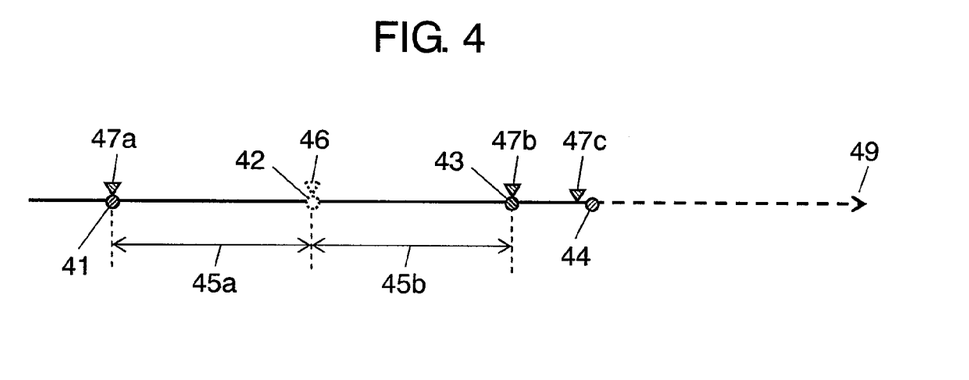
FIG. 4 is a timing chart illustrating operation of the HDD monitoring apparatus in accordance with the exemplary embodiment of the present invention.
Figure 5:
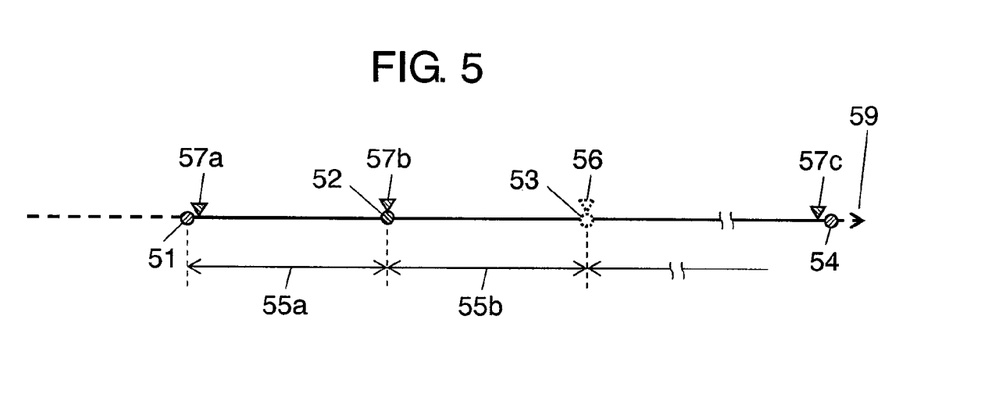
FIG. 5 is a timing chart illustrating operation of the HDD monitoring apparatus in accordance with the exemplary embodiment of the present invention.

Next, the operation of the HDD monitoring apparatus of this exemplary embodiment is further detailed, with reference to FIGS. 3 through 5. These diagrams are timing charts for illustrating the operation of HDD monitoring apparatus 10.

FIG. 3 shows a case where after starting, the system enters a stand-by state, and returns from the stand-by state. The system is a PC, for example. In FIG. 3, abscissa axis 39 shows a time base. At time 31, the system starts. Thereafter, the PC enters the stand-by state at time 32, and returns from the stand-by state at time 33.

HDD control information acquirer 15 acquires the HDD control information at time 36a immediately after the PC has started, time 36b immediately before the PC enters the stand-by state, time 36c immediately after the PC has returned from the stand-by state, and time 36d predetermined time period 35 after the PC has returned from the stand-by state. Controller 11 controls HDD control information acquirer 15 so that the above operations are performed. Predetermined time period 35 is one hour, for example. The stand-by state is a power-saving mode of the PC, in which the current working condition is stored in the memory and at least a part of the operation of the PC is stopped. In this case, although the HDD is energized, the power consumption thereof is minimized, and thus the motor of the HDD is stopped FIG. 4 shows a case where the motor of the HDD is stopped while the system is in operation, and after the motor of the HDD is started so that the data is accessible, the system enters a hibernation state. In FIG. 4, abscissa axis 49 shows a time base. The PC is in normal operation at time 41. At time 42, the motor of the HDD is stopped. At time 43, the motor of the HDD is started so that the HDD is accessible. The system enters the hibernation state at time 44. Each of predetermined time period 45a and predetermined time period 45b is one hour, for example.

HDD control information acquirer 15 acquires the HDD control information at time 47a. Thereafter, at time 42 when predetermined time period 45a has elapsed, the motor of the HDD is stopped. For this reason, at time 46, HDD control information acquirer 15 does not acquire the HDD control information. At time 43 after predetermined time period 45b has elapsed since time 42, the PC is in normal operation and the motor of the HDD is started so that the HDD is accessible. Thus, HDD control information acquirer 15 acquires the HDD control information at time 47b. Then, HDD control information acquirer 15 acquires the HDD control information at time 47c immediately before the PC enters the hibernation state. Controller 11 controls HDD control information acquirer 15 so that the above operations are performed.

HDD motor state detector 14 detects if the motor of the HDD is stopped or not. Elapsed time detector 13 determines whether or not predetermined time period 45a or predetermined time period 45b has elapsed.

Incidentally, the hibernation state means a state in which the PC stores all the data in the memory thereof and is shut down. Of course, in this case, the HDD is not energized and the motor of the HDD is stopped. When the PC comes out of the hibernation state, it returns to the original state thereof.

FIG. 5 shows sequential states where the system returns from the hibernation state, the motor of the HDD is stopped and started again so that the HDD is accessible, and the system normally operates and shuts down. In FIG. 5, abscissa axis 59 shows a time base. The system returns from the hibernation state at time 51. At time 52, the motor of the HDD is started so that the HDD is accessible. At time 53, the motor of the HDD is stopped. At time 54, the system is powered off and shut down.

HDD control information acquirer 15 acquires the HDD control information at time 57a immediately after the HDD has returned from the hibernation state. At time 57b when predetermined time period 55a has elapsed since time 51 when the HDD returned from the hibernation state, HDD control information acquirer 15 acquires the HDD control information. At time 53 when predetermined time period 55b has further elapsed since time 52, the motor of the HDD is stopped. For this reason, HDD control information acquirer 15 does not acquire the HDD control information at time 56. At time 57c immediately before the system is powered off at time 54, HDD control information acquirer 15 acquires the HDD control information. Controller 11 controls HDD control information acquirer 15 so that the above operations are performed.

As obvious from the above description, for a PC, for example, HDD control information acquirer 15 acquirers the HDD control information at the following timing when: (a) the PC starts (at power-on); (b) the PC completes the operation (at power-off); (c) the PC enters and returns from the stand-by state; (d) the PC enters and returns from the hibernation state; and (e) the PC starts and returns from the stand-by state, and a predetermined time period has elapsed since the PC returned from the hibernation state. However, at timing (e), when the motor of the HDD is stopped, HDD control information acquirer 15 does not acquire the HDD control information. When the PC is in the stand-by or hibernation state, the motor of the HDD is naturally stopped. Thus, HDD control information acquirer 15 does not acquire the HDD control information even when a predetermined time period has elapsed.

The invention presents an apparatus and a method of monitoring the state of a hard disk drive without inducing troubles in the hard disk drive. The foregoing explanation is based on the information of operating state of the HDD motor. The invention, however, does not make use of the information of operating state of the HDD motor only. An embodiment utilizing other data than the information of operating state of the motor is explained in FIG. 6.

Figure 6:
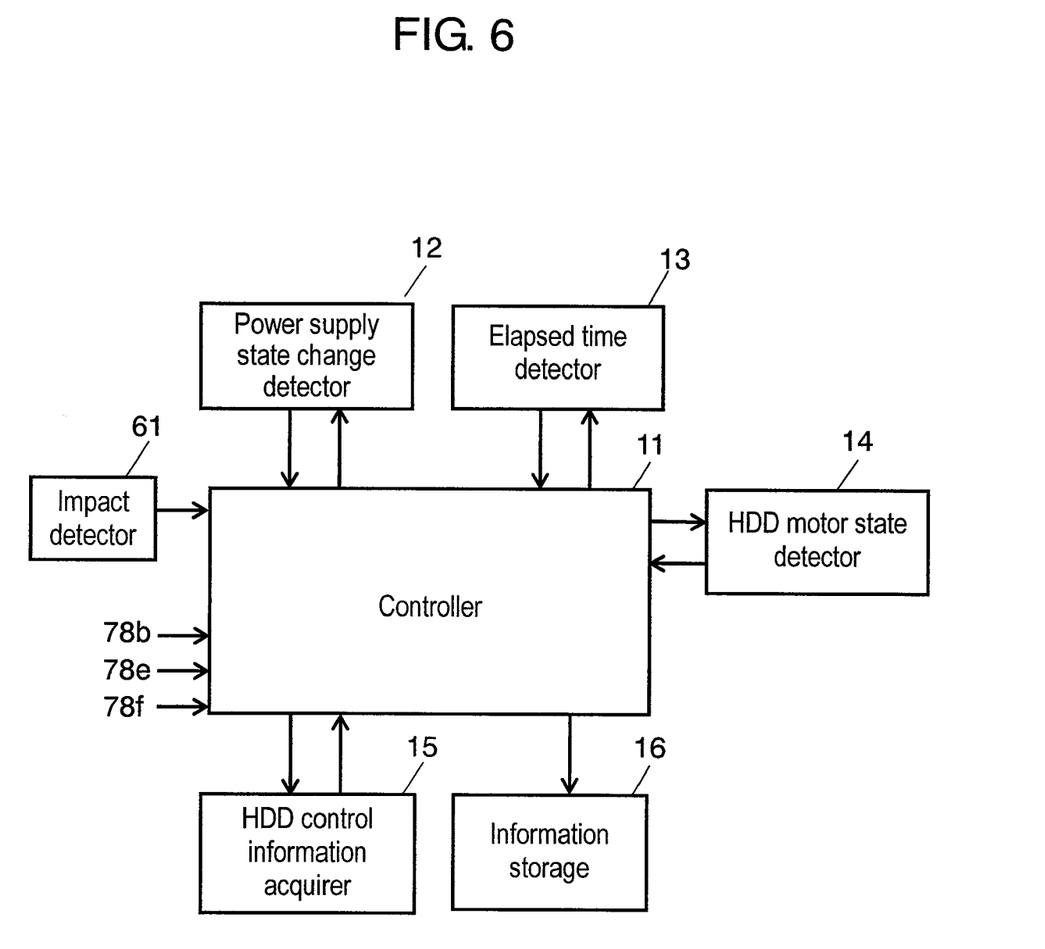
FIG. 6 is other block diagram of a HDD monitoring apparatus in accordance with an exemplary embodiment of the present invention.

FIG. 6 is a block diagram of other mechanism of the invention utilizing other data than the information of operating state of the motor. In FIG. 6, the structure is same as in FIG. 1 except for impact detector 61, and same parts as in FIG. 1 are identified with same reference numerals. Mainly the different parts from FIG. 1 are explained below.

Figure 7:
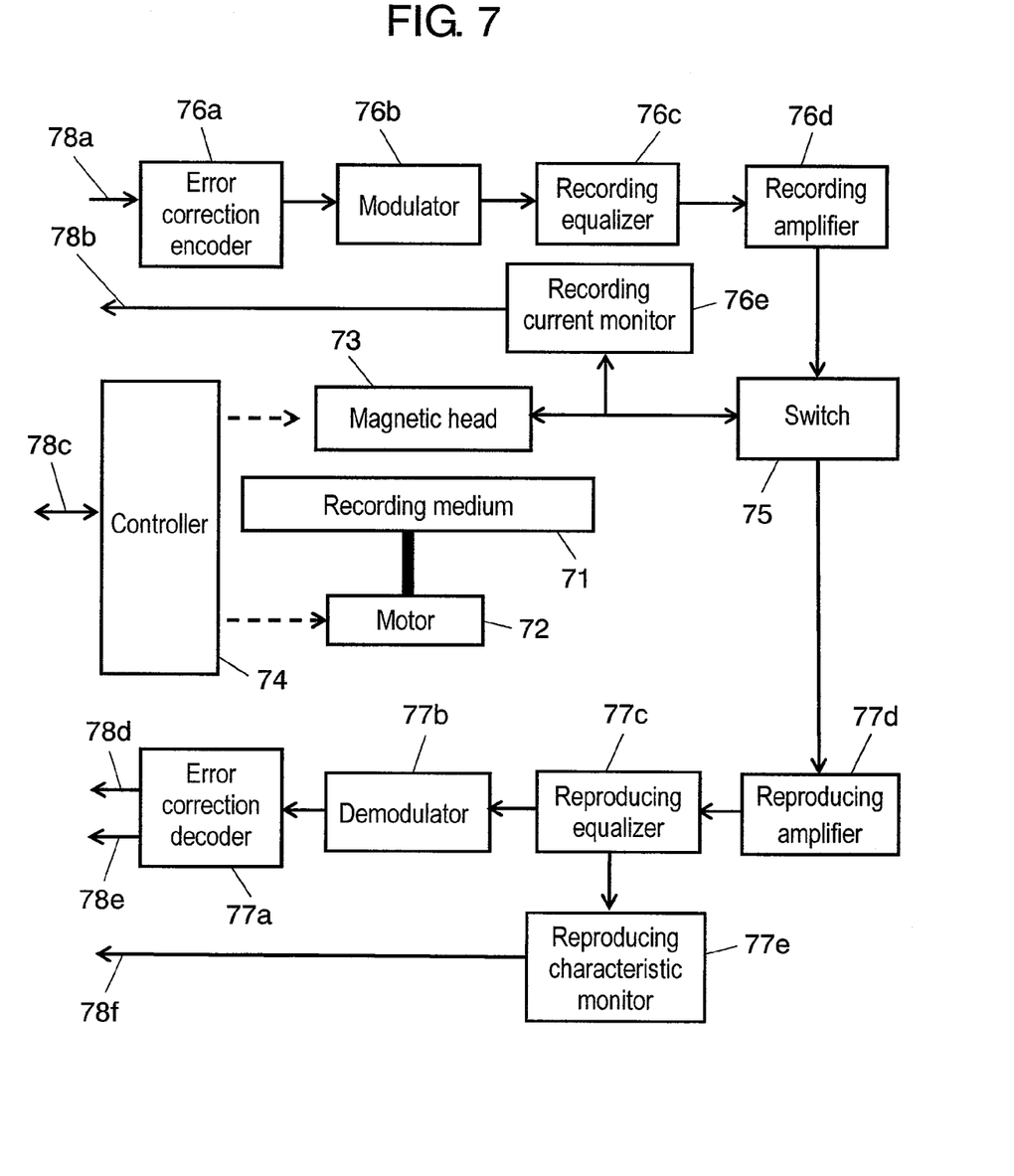
FIG. 7 is a block diagram of a HDD in accordance with an exemplary embodiment of the present invention.

Input signals from terminals 78b, 78e, 78f are described below by referring to FIG. 7.

Impact detector 61 detects the system impact or acceleration. Impact detector 61 includes, for example, impact sensor or acceleration sensor, and detects the impact or acceleration. The output of impact detector 61 is supplied to controller 11. Controller 11 judges the degree of impact or acceleration of the system on the basis of the signal related to impact or acceleration issued from impact detector 61. Controller 11, also considering the judging result, judges if the detected impact or acceleration applied to the system exceeds a specified range or not, and determines the control of HDD control information acquirer 15. In this configuration, if there is impact or acceleration possibly inducing troubles in the HDD, then HDD control information acquirer 15 is prevented from acquiring control information. The invention hence realizes the monitoring apparatus and monitoring method of hard disk capable of further lowering the possibility of inducing troubles in the HDD.

Another embodiment using other data than the information of operating state of the motor is explained below. FIG. 7 is a block diagram of example of configuration of HDD of the invention. In FIG. 7, the data to be recorded is supplied in the HDD by way of data input terminal 78a. Error correction encoder 76a encodes the entered data. Modulator 76b modulates the output of error correction encoder 76a. The output signal of modulator 76b is equalized by recording equalizer 76c, and is supplied into switch 75 by way of recording amplifier 76d. Switch 75 is also connected to reproducing amplifier 77d. When the HDD executes recording operation, switch 75 connects the output of recording amplifier 76d to magnetic head 73, and a recording current flows in magnetic head 73. On the other hand, when the HDD executes reproduction or seek, switch 75 connects the output of magnetic head 73 to reproducing amplifier 77d. Recording medium (hard disk) 71 is rotated as required by motor 72. Magnetic head 73 records into recording medium 71 or reproduces from recording medium 73. At the time of reproduction or seek, the signal reproduced by magnetic head 73 is supplied into reproducing amplifier 77d by way of switch 75, and amplified. The output of reproducing amplifier 77d is equalized by reproducing equalizer 77c, and demodulated by demodulator 77b. Error correction decoder 77a corrects the error of output of demodulator 77b, and decodes. Reproduction data created after error correction and decoding is issued from the HDD by way of data output terminal 78d. Error correction decoder 77a also issues the signal relating to error rate of an error existing in the data issued from demodulator 77b, through terminal 78e. Controller 74 executes rotation control of motor 72, and tracking control of magnetic head 73. Tracking control of magnetic head 73 is generally controlled in both directions of parallel direction and perpendicular direction to the side of recording medium 71. Controller 74 can both receive and send specified signal with external unit by way of terminal 78c. Recording current monitor 76e monitors the recording current flowing in magnetic head 73 at the time of recording. The monitoring result is sent out from terminal 78b. Reproduction characteristic monitor 77e receives output signal from reproducing equalizer 77c, and monitors whether abnormality is included or not in the output signal of reproducing equalizer 77c. This monitoring result is sent out from terminal 78f.

Recording current monitor 76e, reproducing characteristic monitor 77e, and error correction decoder 77a have functions to monitor the recording state and reproducing state of data of the hard disk. These recording current monitor 76e, reproducing characteristic monitor 77e, and error correction decoder 77a having functions to monitor the recording state and reproducing state of data of the hard disk are commonly called monitor unit.

If recording medium 71 and magnetic head 73 are too close to each other, or abnormal recording state or abnormal reproducing state occurs, troubles of the HDD may be induced. In the event of such phenomenon, abnormality occurs in the recording current, reproducing characteristic, or error rate. Such abnormality is recording current is detected by recording current monitor 76e, and the monitoring result is sent out from terminal 78b. Abnormality in reproducing characteristic or error rate is detected by reproducing characteristic monitor 77e or error correction decoder 77a, and the monitoring result of reproducing characteristic is sent out from terminal 78f, and abnormality of error rate is sent out from terminal 78e. These outputs are supplied in controller 11 of FIG. 6, and controller 11 determines the control of HDD control information acquirer 15 also in consideration of these judging results.

Therefore, controller 11 in FIG. 1 or FIG. 6 can also determine the control of HDD control information acquirer 15 also in consideration of the output from recording current monitor 76e, the output from reproducing characteristic monitor 77e, or the output from error correction decoder 77a. In such configuration, HDD control information acquirer 15 is prevented from acquiring control information when there is a possibility of occurrence of induction of troubles in the HDD. It hence realizes the HDD monitoring apparatus and monitoring method further reduced in possibility of occurrence of induction of troubles in the HDD.

In the above description, SMART information is used as the HDD control information. However, the HDD control information can include such information other than SMART information that need not be acquired even by restoring the HDD from the hibernation state. The HDD control information further can include information without urgency other than that described above. The information to be acquired together with the SMART information and other than the above SMART information includes information on identification of the HDD, and information on connection and disconnection of a docking station. The information on identification of the HDD includes the model number and production number of the HDD. The docking station is also called a cradle or port replicator, i.e. an accessory to be docked to a notebook PC so that the notebook PC is used like a desktop PC.

In this manner, in the present invention, the HDD information with no urgency can be acquired without starting or restoring the motor of the HDD from the stop state, and can be acquired at any time while the HDD is in operation.

In the above description, information storage 16 is in the HDD; however, information storage 16 may be a USB memory or a removable disk, such as a SD card (trademark).

In the above description, HDD motor state detector 14 for detecting whether or not the motor of the HDD is stopped is provided; however, a HDD power supply state detector for detecting if the HDD is powered on or off may be provided, instead. Of course, the predetermined time period can arbitrarily be changed.

As described above, the apparatus and method of monitoring a HDD of the present invention detect the state of the motor of the HDD while monitoring the state of the HDD, and do not acquire the HDD control information while the motor is stopped.

Further, no access to the HDD while the motor of the HDD is stopped can continue the stop state of the motor. This structure can prevent the troubles induced while the motor of the HDD is running. Such troubles include damages to the disk surface caused by vibration or shock to the head while the HDD is in operation. An apparatus and method of monitoring a HDD of the present invention are useful as a HDD monitoring system, or the like.

What is claimed is:

1. A hard disk drive (HDD) monitoring apparatus comprising:
   an elapsed time detector for detecting a predetermined time period has elapsed while a system including a HDD is in operation;
   a HDD motor state detector for detecting a state of a motor of the HDD;
   a HDD control information acquirer for acquiring control information on the HDD;
   an information storage for storing the control information; and
   a controller for taking control so that the HDD control information acquirer acquires the control information, and the information storage stores the control information, when the elapsed time detector detects the predetermined time period has elapsed and the HDD motor state detector detects the motor of the HDD is not stopped.

2. The hard disk drive monitoring apparatus of claim 1, wherein the control information is SMRT information.

3. The hard disk drive monitoring apparatus of claim 1, wherein the control information includes information related to identification of the HDD, and information on coupling and decoupling a docking station.

4. The hard disk drive monitoring apparatus of claim 1, wherein the information storage is the HDD.

5. The hard disk drive monitoring apparatus of claim 1, wherein the information storage is a removable disk.

6. The HDD monitoring apparatus of claim 1, further comprising:
   an impact detector composed of at least either impact sensor or acceleration sensor,
   wherein the controller controls so as to acquire the control information in the HDD control information acquirer and store in the information storage if the degree of system impact or acceleration is within a specified range on the basis of the signal about impact or acceleration sent out from the impact detector.

7. The hard disk drive monitoring apparatus of claim 1, further comprising:

a monitor unit for monitoring at least either data recording state or reproducing state in the HDD, wherein if the monitor unit does not detect abnormal recording state or reproducing state, the controller controls so as to acquire the control information in the HDD control information acquirer and store in the information.

8. The hard disk drive monitoring apparatus of claim 7, wherein the abnormal reproducing state includes a high state of error rate depending on the output data being reproduced and demodulated.

9. A hard disk drive (HDD) monitoring method comprising:
   detecting a predetermined time period has elapsed while a system including a HDD is in operation;
   detecting a state of a motor of the HDD;
   acquiring control information on the HDD, when detecting the predetermined time period has elapsed and the motor of the HDD is not stopped; and
   recording the control information.

10. A hard disk drive (HDD) monitoring apparatus comprising:
   a power supply state change detector for detecting a change in a state of a power supply of a system including a HDD;
   a HDD motor state detector for detecting a state of a motor of the HDD;
   a HDD control information acquirer for acquiring control information on the HDD;
   an information storage for storing the control information; and
   a controller for taking control so that the HDD control information acquirer acquires the control information and the information storage stores the control information, when the power supply state detector detects a change in the power supply of the system and the HDD motor state detector detects that the motor of the HDD is not stopped.

11. The hard disk drive monitoring apparatus of claim 10, wherein the control information is SMRT information.

12. The hard disk drive monitoring apparatus of claim 10, wherein the control information includes information related to identification of the HDD, and information on coupling and decoupling a docking station.

13. The hard disk drive monitoring apparatus of claim 10, wherein the information storage is the HDD.

14. The hard disk drive monitoring apparatus of claim 10, wherein the information storage is a removable disk.

15. The HDD monitoring apparatus of claim 10, further comprising:
   an impact detector composed of at least either impact sensor or acceleration sensor,
   wherein the controller controls so as to acquire the control information in the HDD control information acquirer and store in the information storage if the degree of system impact or acceleration is within a specified range on the basis of the signal about impact or acceleration sent out from the impact detector.

16. The hard disk drive monitoring apparatus of claim 10, further comprising:
   a monitor unit for monitoring at least either data recording state or reproducing state in the HDD,
   wherein if the monitor unit does not detect abnormal recording state or reproducing state, the controller controls so as to acquire the control information in the HDD control information acquirer and store in the information.

17. The hard disk drive monitoring apparatus of claim 16, wherein the abnormal reproducing state includes a high state of error rate depending on the output data being reproduced and demodulated.

18. A hard disk drive (HDD) monitoring method comprising:
   detecting a change in a state of a power supply of a system including a HDD;
   detecting a state of a motor of the HDD;
   acquiring control information on the HDD, when detecting the power supply of the system has changed and the motor of the HDD is not stopped; and
   recording the control information.

* * * * *